US009514644B2

(12) United States Patent
Fourie

(10) Patent No.: US 9,514,644 B2
(45) Date of Patent: Dec. 6, 2016

(54) IMPLEMENTING LOCATION BASED ACTIONS

(71) Applicant: Pinpark IP Pty Ltd., West Perth (AU)

(72) Inventor: Charl Fourie, West Perth (AU)

(73) Assignee: Pinpark IP Pty Ltd., West Perth (AU)

( * ) Notice: Subject to any disclaimer, the term of this patent is extended or adjusted under 35 U.S.C. 154(b) by 0 days.

(21) Appl. No.: 14/192,214

(22) Filed: Feb. 27, 2014

(65) Prior Publication Data

US 2014/0354453 A1 Dec. 4, 2014

(30) Foreign Application Priority Data

May 31, 2013 (AU) ................................ 2013901976

(51) Int. Cl.
*G08G 1/14* (2006.01)
*H04W 4/02* (2009.01)
(Continued)

(52) U.S. Cl.
CPC .............. *G08G 1/147* (2013.01); *G08G 1/144* (2013.01)

(58) Field of Classification Search
CPC .. G07B 15/02; G06Q 10/02; G06Q 30/0284; G06Q 10/00; G06Q 10/0631; G06Q 10/1053; G06Q 20/04; G06Q 20/12; G06Q 20/20; G06Q 20/32; G06Q 20/322; G06Q 20/3224; G06Q 30/02; G06Q 30/0207; G06Q 30/0236; G06Q 30/0241; G06Q 30/0255; G06Q 30/0259; G06Q 30/0261; G06Q 30/0267; G06Q 30/0273; G06Q 30/06; G06Q 30/0601; G06Q 30/0639; G06Q 30/08; G08G 1/14; G08G 1/144; G08G 1/148
USPC ............ 340/932.2, 539.1, 928; 705/13, 14.1, 705/14.36, 14.53, 14.58
See application file for complete search history.

(56) References Cited

U.S. PATENT DOCUMENTS 6,381,540 B1 * 4/2002 Beason .................... G01C 5/06 342/120
6,493,676 B1 * 12/2002 Levy .................. G06Q 30/0284 705/13

(Continued)

FOREIGN PATENT DOCUMENTS

| | | |
|---|---|---|
| CA | 2417060 | 2/2004 |
| WO | WO 03/005324 | 1/2003 |
| WO | WO 2007/000011 | 1/2007 |

OTHER PUBLICATIONS

Integrated Multi-Constellation GNSS Receiver, BCM4752, http://www.broadcom.com/products/GPS/GPS-Silicon-Solutions/BCM4752, accessed on Feb. 27, 2014.

(Continued)

*Primary Examiner* — Fekadeselassie Girma
(74) *Attorney, Agent, or Firm* — Greenberg Traurig, LLP; David J. Dykeman; Roman Fayerberg

(57) ABSTRACT

A system (8) for implementing at least one action based on a location of a mobile communication device (10). The system (8) comprises a controller (16), storage (18) storing electronic program instructions for controlling the controller (16), and input means (24). The controller (16) is operable, under control of the electronic program instructions, to receive input via the input means (24), the input comprising an indication of a location of the mobile communication device (10), process the indication to determine whether the location of the mobile communication device (10) corresponds to a location of a predefined area, and implement the at least one action based on the determination.

20 Claims, 6 Drawing Sheets

(51) Int. Cl.
*G06Q 10/02* (2012.01)
*G07B 15/02* (2011.01)

(56) References Cited

U.S. PATENT DOCUMENTS 6,501,391 B1 * 12/2002 Racunas, Jr. .............. 340/932.2
7,135,975 B2 * 11/2006 Hoshina ............. G08B 13/1427 340/5.74
2003/0220835 A1 * 11/2003 Barnes, Jr. ...................... 705/14
2005/0234772 A1 * 10/2005 Haruki ............... G06Q 30/0231 705/14.31
2006/0046233 A1 3/2006 Byham
2006/0267799 A1 * 11/2006 Mendelson ................ 340/932.2
2011/0131154 A1 * 6/2011 Faber ..................... G01C 21/32 705/418
2012/0053966 A1 * 3/2012 Kolodziej ......................... 705/5
2012/0143657 A1 * 6/2012 Silberberg ................... 705/14.1
2012/0188101 A1 * 7/2012 Ganot ........................ 340/932.2
2012/0188181 A1 7/2012 Ha et al.
2012/0203600 A1 * 8/2012 Fiorucci et al. ................ 705/13
2014/0372185 A1 * 12/2014 Ganot ............................. 705/13

OTHER PUBLICATIONS

LocataTech Explained, http://www.locatacorp.com/technology/locata-tech-explained/, accessed on Feb. 27, 2014.
International Search Report and Written Opinion in International Patent Application No. PCT/AU2014/000570 mailed Jul. 15, 2014.

* cited by examiner

MOBILE DEVICE RECEIVING ASSISTED CORRECTIONS FROM RTK NETWORK

FIGURE 2 - PARKING BAY MAPPING (creating location boxes)

FIGURE 3 - PARKING BAY LOCATION BOX

MOBILE DEVICE RECEIVING LOCATA ASSISTED LOCATION READINGS

FIGURE 7 - PURCHASING AN ELECTRONIC PARKING TICKET
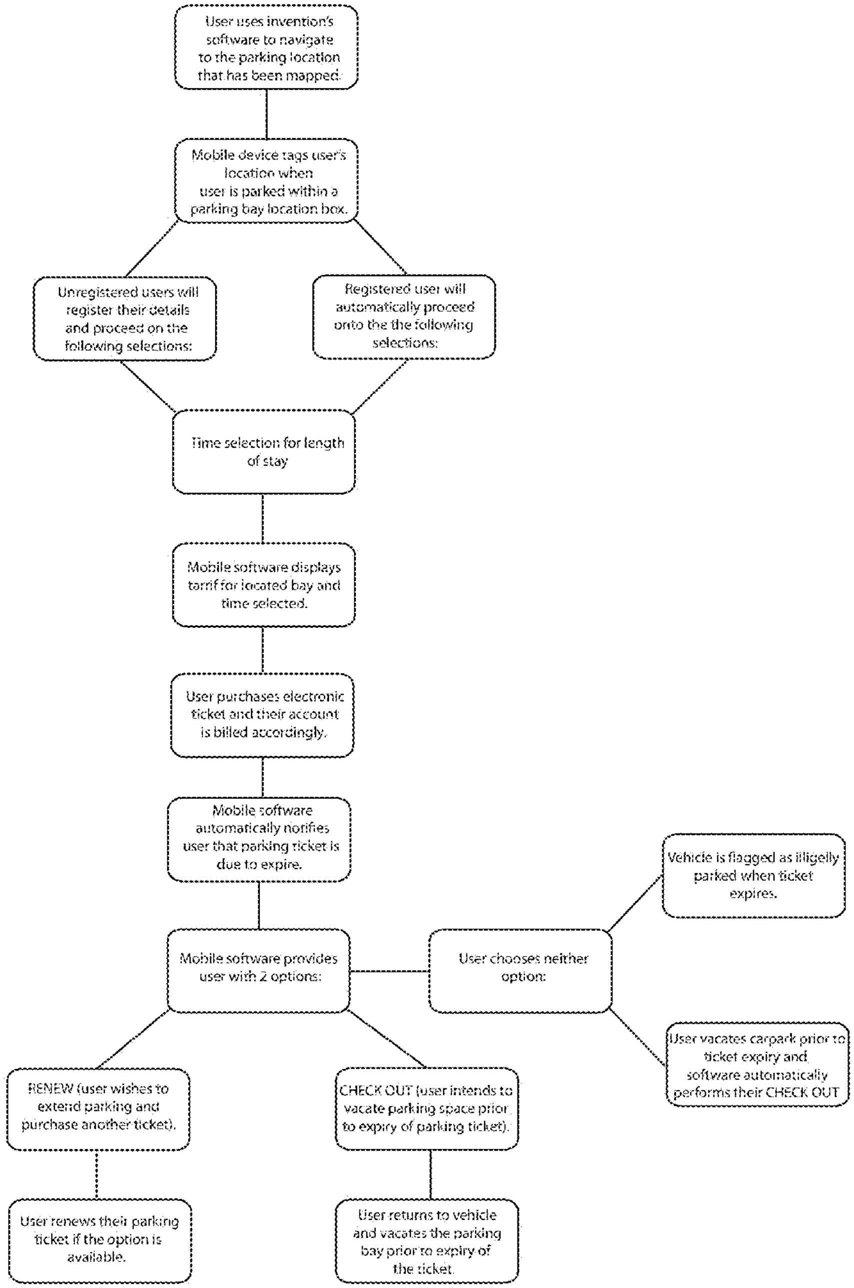

IMPLEMENTING LOCATION BASED ACTIONS

RELATED APPLICATION(S)

This application claims the benefit of and priority to Australian Patent Application No. 2013901976, filed on May 31, 2013, which is incorporated by reference herein in its entirety.

FIELD OF THE INVENTION

The present invention relates generally to a system and method for implementing action on the basis of location.

Although the present invention will be described with particular reference to a system and method for implementing actions associated with an area for parking a vehicle, it will be appreciated that it may be used in respect of actions associated with other locations or areas.

BACKGROUND ART

In many situations, actions or tasks available or required to be performed by a person depend on their location.

For example, in the case of parking a vehicle at a parking facility where payment is required for use of the facility, required actions comprise making the payment to register for parking and establishing that it has been paid.

Parking services have evolved significantly since the day of metered coin machines being the preferred method of registration and payment for a single or multiple number of parking bays.

Advancement to the systems and methods presently used to register and pay for parking, whether on street, in an undercover or open parking lot, or other facility, has largely been developed with the intention of automating the parking process.

Regarding indoor parking services, automated parking systems are in use in closed parking lots where a parking vehicle is registered and identified at an entrance and at an exit, typically barriered, of the facility.

The vehicle is traditionally detected via number plate recognition, unique keycard or disc identification presented by a driver of the vehicle, or via a more conventional method of the driver obtaining a ticket from a ticketing machine at the entrance and paying for the ticket prior to departure from the facility, for deposit at the exit.

Regarding outdoor parking services, in open parking lots without automated parking barriers, the most popular method of occupying and renting a parking bay is through "pay and display" ticketing. In this method, a ticket for parking is purchased from a ticket machine located within the parking lot and displayed on the vehicle's dashboard, with the date and expiry time visible, as evidence that the parking has been paid for.

There is prior art that takes advantage of the development and installation of parking sensory infrastructure within or around a parking bay or car park facility.

These systems are operable to detect and register presence of a parked vehicle within a parking bay space and then transmit real time parking data to a central management control unit which monitors the availability of a particular number of parking spaces. This unit will then convert the data into usable information which can be made available to an owner and/or manager of the parking facility and/or other users for reviewing parking availability and making instant payments.

The parking sensing infrastructure to be installed is disclosed as being in the form of kerb devices for off street parking, and in the form of parking sensor nodes or units for undercover or outdoor parking.

A limitation of systems implemented using such devices and units is that their installation and maintenance is often expensive, they can be a non-pleasing aesthetic to a parking area and thus often slow to be implemented and supported by government authorities and private car park owners. Furthermore, that may be prone to damage via vandalism, for example, leading to additional expense in protecting, repairing, and replacing them.

Optical digital recognition parking systems have been disclosed using optical digital recognition imaging operable to record number plate details of a vehicle when it enters a parking area.

The system is then operable to either bill the account of the preregistered vehicle owner, or send an account to the owner of the registered vehicle.

Other popular uses of this technology is with the detection, registration and charges that apply to vehicles that enter prescribed congestion zones in large cities such as London and New York.

Limitations of this technology include the required associated installation and maintenance of expensive infrastructure.

Furthermore, such systems may also not always account for all parking bays and areas, especially multiple small pockets of off street parking often found in urban areas. It is simply too expensive and unfeasible to account for it on a large scale.

Systems have been disclosed using radio frequency identification (RFID) tag technology. These technologies come in the form of keycards, keyfobs and dashboard parking discs, for example. They are popular and effective in enclosed parking areas and provide the additional benefit of the driver not having to take a ticket (or produce coins) upon entrance for processing prior to exit.

Typically, when the tag is first issued, it is preregistered with the vehicle owner's identification and billing information. A unique digital identification code is then registered against the tag by a respective car park management authority.

When the tag is used at entrance or exit of the car park, it records the date and time, which is then billed to the vehicle owner in accordance with the terms and conditions of the car park management authority.

Limitations of this technology include that it does not successfully account for off street parking, except for when RFID metal detectors are installed in each bay of such parking.

Furthermore, it is an expensive system and requires significant infrastructure installation and upkeep.

Cellular parking systems have also been disclosed, and are presently in use in areas where paid parking (usually ticketed with credit card or coin) is also available.

Such parking payment systems provide users the option of sending a communication such as a Short Message Service (SMS) text message or making a telephone call to management of the car park, providing their account (if preregistered) or car identification details, and that of the particular bay or parking lot/zone desired to be used. Their account is then charged or they transact via credit card in exchange for renting the parking area for the agreed time.

A main limitation of such systems is that due to manual registration, it can be time consuming (thus simply better to use pay and display ticketing) and it leaves the system open to error as the user may record their parking information incorrectly, thereby invalidating their parking.

An area that has lacked true advancement has been in developing the capability of offering real time information to users and managers/owners of a parking facility to confirm the availability, usage and trends of individual parking areas within the facility, without having to undergo the costly inconvenience of installing visual camera or sensory based infrastructure within the parking areas to gather and monitor parking data.

It is against this background that the present invention has been developed.

SUMMARY OF THE INVENTION

It is an object of the present invention to overcome, or at least ameliorate, one or more of the deficiencies of the prior art mentioned above, or to provide the consumer with a useful or commercial choice.

Other objects and advantages of the present invention will become apparent from the following description, taken in connection with the accompanying drawings, wherein, by way of illustration and example, a preferred embodiment of the present invention is disclosed.

According to a first broad aspect of the present invention, there is provided a system for implementing at least one action based on a location of a mobile communication device, the system comprising:

- a controller;
- storage storing electronic program instructions for controlling the controller; and
- input means;

wherein the controller is operable, under control of the electronic program instructions, to:

- receive input via the input means, the input comprising an indication of a location of a mobile communication device;
- process the indication to determine whether the location of the mobile communication device corresponds to a location of a predefined area; and
- implement the at least one action based on the determination.

Preferably, the predefined area is specified on a virtual map. The virtual map may comprise a set of geographical and/or geological survey coordinates specifying the predefined area in at least two dimensions and preferably three dimensions. In a preferred embodiment, the set of coordinates comprise a set of ground coordinates (x and y dimensions) and a set of spatial (height) coordinates (z dimension), together defining a space.

Preferably, the location comprises a parking facility, and the predefined area comprises a parking bay of a plurality of parking bays of the parking facility. In such embodiments, the at least one action may be selectable from the group comprising parking navigating, registering, booking/reserving, and ticket purchasing and renewing. In embodiments of the invention, the input additionally comprises an indication of an extent of historical activity associated with the predefined area, and the controller is further operable, under control of the electronic program instructions, to assign a value to the predefined area on the basis of the indication of extent of historical activity. In the case where the predefined area comprises a parking bay, the value may represent a price or cost to use the parking bay for a prescribed period of time. The price may be set automatically by use of a demand/supply algorithm or calculation.

The input means may comprise at least one sensor, which may be part of a sensor system or a set of sensors.

Preferably, the sensor system comprises a primary position sensor operable to generate a signal providing a primary indication of the location of the mobile device. In embodiments of the invention, the primary position sensor comprises radio-location based and/or Global Navigation Satellite Systems (GNSS) driven technology.

In embodiments of the invention, the sensor system comprises a secondary position sensor operable to increase the accuracy of the primary indication of the location of the mobile device provided by the primary position sensor signal. The secondary position sensor preferably comprises one or a combination of Locata®, a Real Time Kinetic (RTK), Wifi, Bluetooth, Near Field Communication (NFC), radio, and inertial sensor systems.

The intertial sensor systems may comprise an acceleration sensor, an orientation sensor, a direction sensor, and a position sensor.

Preferably, the location of the mobile communication device is determined accurately, and preferably exactly or practically near exactly with at least a location fixing with a discrepancy of less than or equal to 300 mm.

Preferably, the system further comprises a display for displaying a user interface. The display, user interface and input means may be integrated, in a touchscreen for example. Alternatively, they may be discrete.

Preferably, the input comprises user instructions which are input by a user via the input means. The user instructions may comprise a command to perform an action, in which case the controller is operable, under control of the electronic program instructions, to perform the action according to the received user instructions.

Preferably, the electronic program instructions comprise software. The device may comprise a smartphone, personal/notebook/tablet computer, portable media device, or portable navigation device, having the software installed thereon. The software may be provided as a software application downloadable to the device.

Preferably, operations performed by the system occur automatically, without requiring human intervention.

According to a second broad aspect of the present invention, there is provided a method for implementing at least one action based on a location of a mobile communication device, the method comprising:

- storing electronic program instructions for controlling a controller; and
- controlling the controller via the electronic program instructions, to:
- receive an input via an input means, the input comprising an indication of a location of a mobile communication device;
- process the indication to determine whether the location of the mobile communication device corresponds to a location of a predefined area; and
- implement the at least one action based on the determination.

According to a third broad aspect of the present invention, there is provided a computer-readable storage medium on which is stored instructions that, when executed by a computing means, causes the computing means to perform the method according to the second broad aspect of the present invention as hereinbefore described.

According to a fourth broad aspect of the present invention, there is provided a computing means programmed to carry out the method according to the second broad aspect of the present invention as hereinbefore described.

According to a fifth broad aspect of the present invention, there is provided a data signal including at least one instruction being capable of being received and interpreted by a computing system, wherein the instruction implements the method according to the second broad aspect of the present invention as hereinbefore described.

BRIEF DESCRIPTION OF THE DRAWINGS

In order that the invention may be more fully understood and put into practice, preferred embodiments thereof will now be described with reference to the accompanying drawings, in which:

FIG. 7 is a flow chart for a user completing navigating, registering, and parking ticket purchasing and renewing actions of a method in accordance with an aspect of the present invention.

DESCRIPTION OF EMBODIMENTS

Figure 1:
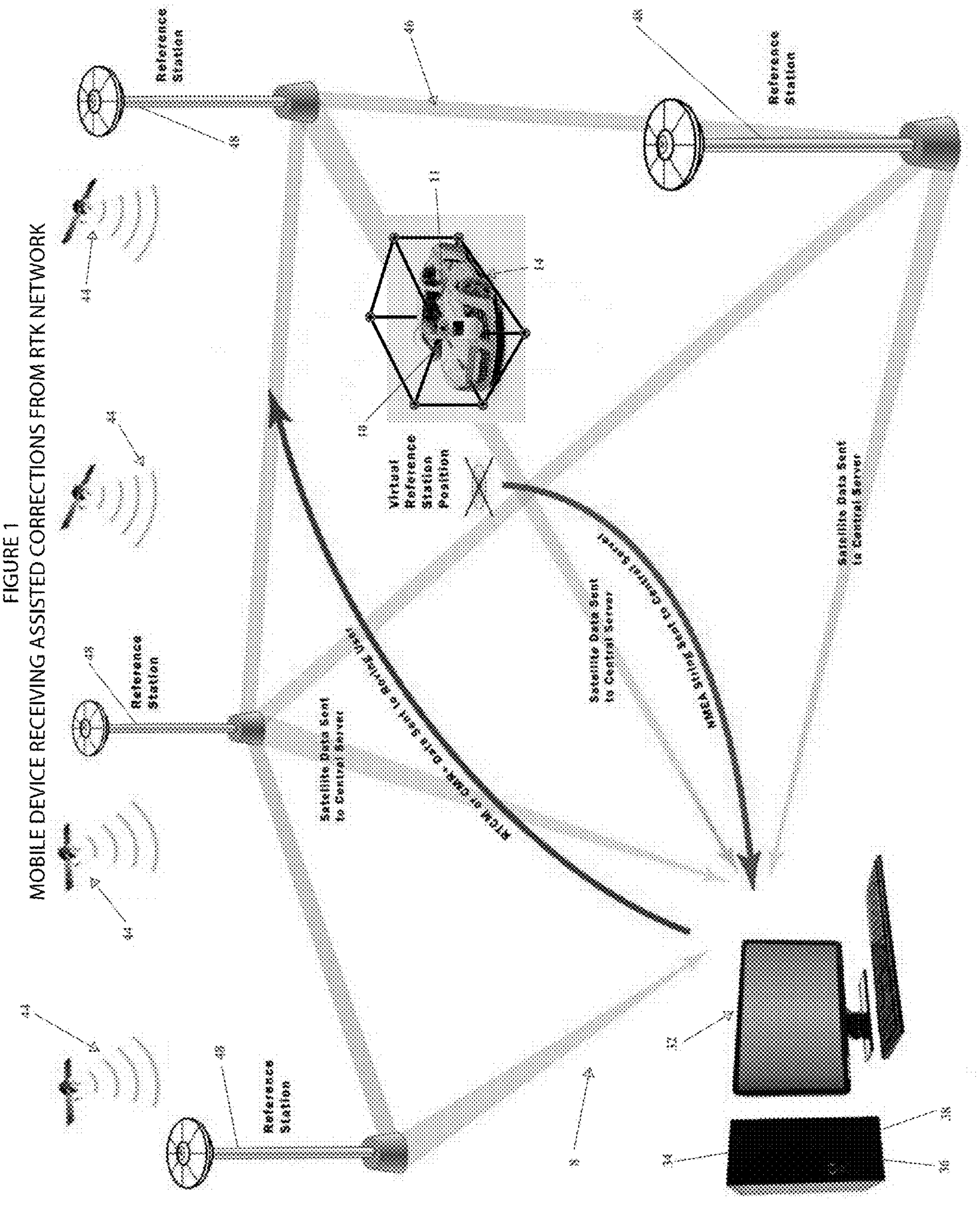
FIG. 1 depicts a simplified system diagram of an embodiment of a system in accordance with an aspect of the present invention.

In the drawings, like features have been referenced with like reference numbers.

In FIG. 1, there is depicted an embodiment of a system 8 for implementing at least one action based on a location of a mobile communication device 10 in accordance with an aspect of the present invention.

Figure 2:
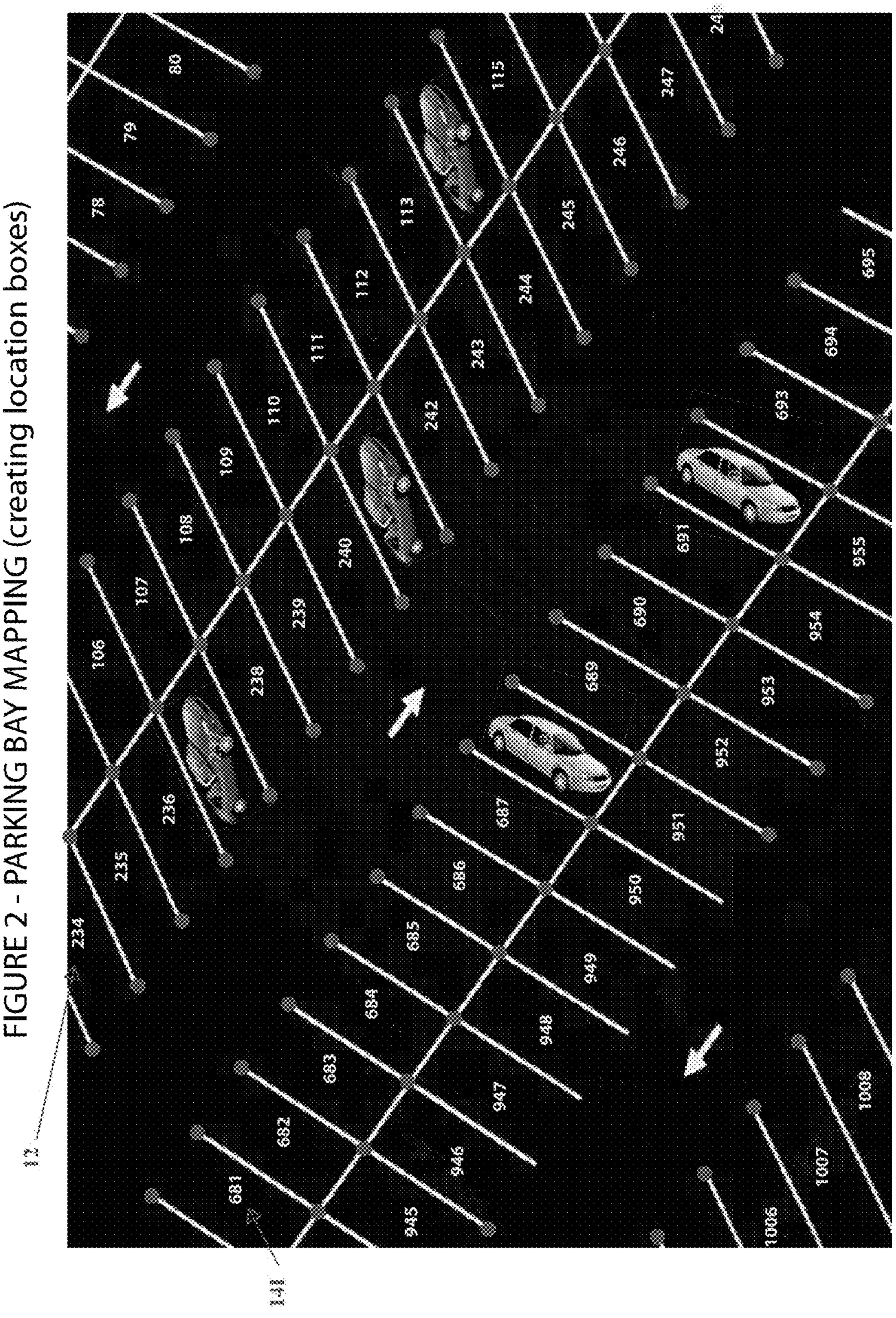
FIG. 2 depicts an aerial view of a car park location that has been mapped with geographic survey coordinates in accordance with an aspect of the present invention.

In the embodiment described, the location is one of a plurality of locations, at least one of which relates to an area for parking a vehicle 11, and particularly a car park 12 comprising a plurality of bays 14 for parking vehicles, as depicted in FIG. 2. The at least one action is selectable from a set of actions related to and/or associated with the car park 12, including checking availability of and booking/reserving a particular bay 14 of the car park 12, accurately navigating to the car park 12 and the particular bay 14, detecting presence of the device 10 within the particular bay 14, and processing different tasks including registering the presence of the device 10 and paying for use of the particular bay 14. The car park 12 may be any parking facility, comprising one or a combination of public and/or privately owned bays 14, located indoors and/or outdoors, and may be single or multi-storied/leveled. The embodiment of the invention is particularly suited for implementing actions in respect of a multi-leveled car parking facility as will be described in further detail.

Each of the plurality of locations is managed by a respective management entity, which may also be the owner of the respective location. More than one of the plurality of locations may be managed by a particular management entity. In the embodiment described, the car park 12 is owned and managed by a management entity which may be referred to as a Car Park Owner/Management Company.

It will be appreciated that the invention is not limited in regard to the location(s) or the at least one action, and in alternative embodiments, the invention may be applied to additional and/or alternative locations and implement additional and/or alternative actions to those described. For example, embodiments of the invention have application to fields of recreation, public services, retail, and commerce where accurate geo-location may be used to detect the presence of a mobile communication device in a predefined and/or pre-surveyed location and to implement one or more tasks applicable thereto. Such tasks may include the following, for example. In the field of recreation, automatic registration of a participant to an event when they enter the event's registration location, which may be specified by a location box/space. In the field of retail, the registration of various one or more person(s) inside a shop with various one or more location boxes/spaces. Such embodiments may be operable to facilitate tracking patterns of the person(s) behavior inside the store to better customize the layout of the store and its product placement. In the field of commerce, the automatic registration of one or more person(s) within meeting rooms, or booking/reserving of meeting rooms. Embodiments of the invention can also be used in this context facilitating actions such as passenger registration/check in within air port terminals, for example. Thus, instead of checking in for a particular flight at a check in desk, check in can occur automatically when a suitably enabled device is within a "check in area" registered/designated for a particular flight. Public and private services may use embodiments of the invention to police the quantity of people within various location boxes (such as nightclubs) to manage the distribution of their resources or ensure that overcrowding does not occur, for example.

Each of the plurality of locations has a respective set of location details associated with it, comprising information and/or data relevant to or associated with the location and/or action(s) to be performed/enabled. In the embodiment, the location details for the car park 12 include: identification of the car park 12, such as a name; identification and contact details of the Car Park Owner/Management Company; identification of a location of the car park 12, which may comprise a physical address and/or geographical coordinates of it; a written description of the car park 12, which may include a capacity, and details of charge out conditions and rates; and mapping details of the plurality of bays 14 of the car park 12.

In the embodiment, single and/or multiple bays 14 are accurately mapped using a process based on and similar to land surveying (the technique, profession, and science of accurately determining the terrestrial or three-dimensional position of points and the distances and angles between them). Particularly, land surveying techniques are used to create a map of a predefined and predetermined set of parking bays 14. Depending on the location, these bays 14 can range from off-street parking to a small parking lot to an entire multi-storey parking garage, for example.

To begin, a single parking bay 14 is surveyed, moving on to surveying multiple selected bays 14.

Figure 3:
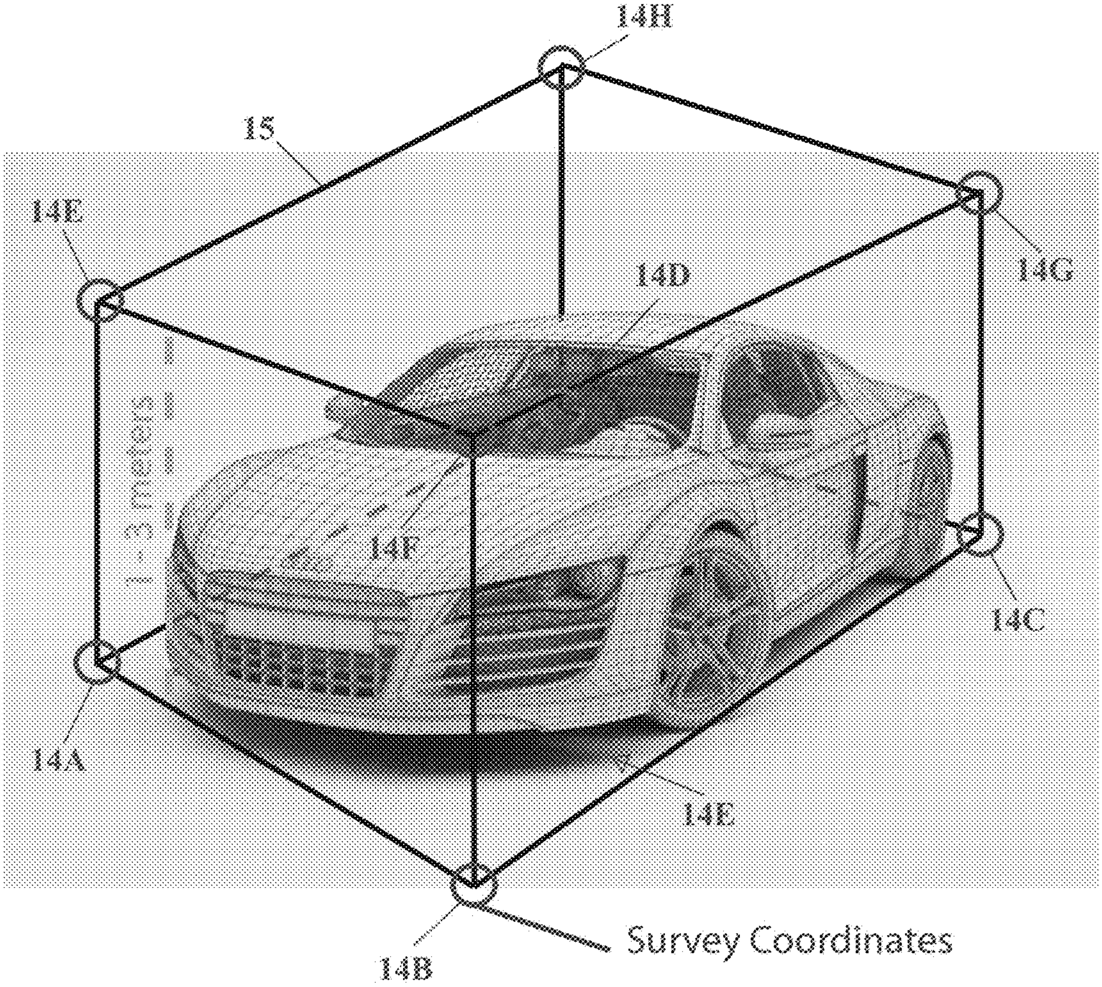
FIG. 3 depicts eight points of geographic survey coordinates making up a virtual location box for a single car parking space of the car park location depicted in FIG. 2.

In the embodiment, as depicted in FIG. 3, each of the bays 14 is rectangularly shaped and as part of the mapping/surveying process is granted four ground geographical and/or geological survey coordinates 14A, 14B, 14C, and 14D, each corresponding to a respective lower/ground corner of the bay 14, and four spatial, preferably 1-3 m high, geographic survey coordinates 14E, 14F, 14G, 14H, each corresponding to a respective upper/elevated corner of the bay 14. In this manner, a virtual location box 15 is formed, defining a space associated with the respective bay 14, and in which a vehicle 11 may be parked. These eight coordinates are completely unique to identifying and specifying the location of the respective bay 14 in three dimensions. It is to be appreciated that the invention is not limited in regard to the shape and dimensions, or the number of coordinates, used in the mapping, and in alternative embodiments of the invention these may vary.

Specifying three dimensional spatial coordinates (virtual location box 15) for each bay 15 advantageously allows for the mapping of multiple storied/leveled facilities. If layer upon layer of two dimensional coordinates (x and y) are overlaid, the different levels of parking bays 14 within the facility will not be identifiable. However, if a third, height dimension (z) is added the parking bays on various levels become identifiable and unique. In embodiments of the invention, implemented in locations having off street or open air parking, the spatial coordinates might not be needed, but are still preferable as they provide an additional four fixing points that provide added confirmation that the location based reading is correct.

Once all of the predetermined parking bays 14 have been surveyed, their respective eight defining coordinates are mapped and recorded, i.e. logged, in the system 8, as will be described in further detail, creating a virtual map of the location. In addition to the eight coordinates, the mapping data includes other information and/or data relevant to or associated with each bay 14, including a fee schedule comprising parking times and charge rates corresponding with each bay 14, and a status of the bay, specifying whether the bay 14 is presently vacant, occupied, or reserved for a specified time period. This may also be recorded when completing the survey, and forms part of the data infrastructure used by the system 8 to locate an available parking bay 14, register a vehicle within a bay 14, reserve a bay 14 for a vehicle, and calculate/process payment of a parking ticket associated with use of the bay 14. In embodiments of the invention, each bay 14 may also be tagged with a unique identification (ID) reference tag 14I that would assist when monitoring activity within it. This may have the form of a unique bay number or reference. In such embodiments, all markers and ID tags are virtual data, so there is no need to physically mark a bay 14, unless the bay/s 14 does not have definable boundaries. Of course, in embodiments of the invention in addition to being digitally marked, the location(s) may also be physically marked.

As will be described in further detail, once the device 10 enters the physical space virtually defined by the virtual location box 15 of a particular bay 14, location based technology of the system 8 is operable to calculate and pinpoint its position, preferably exactly or practically near exactly with at least a location fixing having a discrepancy of less than or equal to 300 mm (location accuracy), and, provided it is within the parameters of the virtual location box 15, it's geographical coordinate will register within the bay 14. The system 8 is also operable to display the virtual map of the location via the device 10, enabling a user of the device 10 to view and confirm the location of their parking to the specific, particular bay 14 via the device 10.

As will also be described in further detail, the location based monitoring of mobile device(s) 10 within a predetermined area interacting with the mapped coordinates of pre-surveyed parking bays within the same area creates a data flow of real time information in the system 8 that is then processed and distributed.

The device 10 is carried a person owning or having authorisation to use one or more vehicles registered to park in the car park 12.

The device 10 comprises a plurality of components, subsystems and/or modules operably coupled via appropriate circuitry and connections to enable the device 10 to perform the functions and operations herein described. The device 10 comprises suitable components necessary to receive, store and execute appropriate computer instructions such as a method for implementing at least one action based on a location of a mobile communication device in accordance with an embodiment of the present invention.

Figure 4:
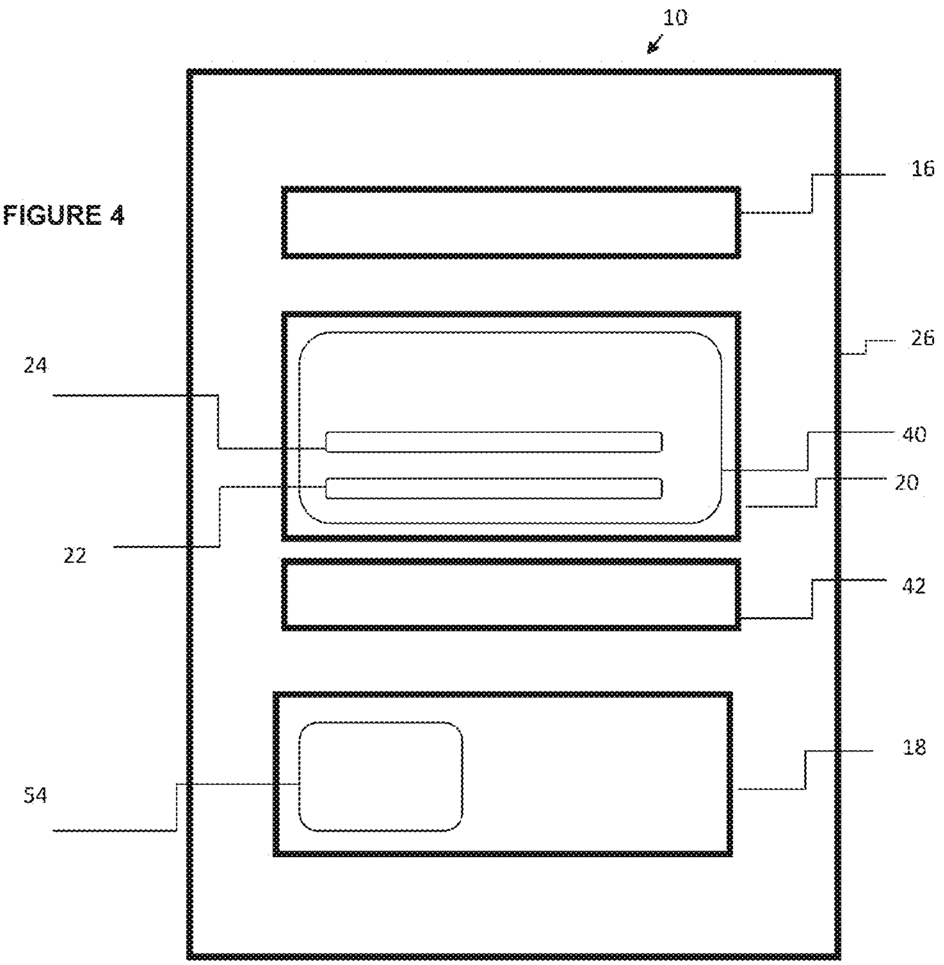
FIG. 4 depicts a schematic diagram of a mobile communication device in accordance with an embodiment of the present invention.

Particularly, and as shown in FIG. 4, the device 10 comprises computing means which in this embodiment comprises a controller 16 and storage 18 for storing electronic program instructions for controlling the controller 16, and information and/or data; a display 20 for displaying a user interface 22; and input means 24; all housed within a container or housing 26.

As will be described in further detail, the controller 16 is operable to: receive input via the input means 24, the input comprising an indication of a location of the device 10; process the indication to determine whether the location of the device 10 corresponds to a location of a predefined area; and implement an action based on the determination.

The controller 16 comprises processing means in the form of a processor.

The storage 18 comprises read only memory (ROM) and random access memory (RAM).

The device 10 is capable of receiving instructions that may be held in the ROM or RAM and may be executed by the processor. The processor is operable to perform actions under control of electronic program instructions, as will be described in further detail below, including processing/executing instructions and managing the flow of data and information through the device 10.

In the embodiment, electronic program instructions for the device 10 are provided via a single software application (app) or module which may be referred to as a User Software (US) app. The US app can be downloaded from a website (or other suitable electronic device platform) or otherwised saved to or stored on storage 18 of the device 10.

In preferred embodiments of the invention, the device 10 comprises a smartphone such as that marketed under the trade mark IPHONE® by Apple Inc, or by other provider such as Nokia Corporation, or Samsung Group, having Android, WEBOS, Windows, or other Phone app platform. Alternatively, the device 10 may comprise other computing means such as a personal, notebook or tablet computer such as that marketed under the trade mark IPAD® or IPOD TOUCH® by Apple Inc, or by other provider such as Hewlett-Packard Company, or Dell, Inc, for example, or other suitable device such as a mobile handset, portable media player, or portable navigation device.

The device 10 also includes an operating system which is capable of issuing commands and is arranged to interact with the US app to cause the device to carry out the respective steps, functions and/or procedures in accordance with the embodiment of the invention described herein. The operating system may be appropriate for the device 10. For example, in the case where the device 10 comprises an IPHONE® smartphone, the operating system may be iOS.

Figure 5:
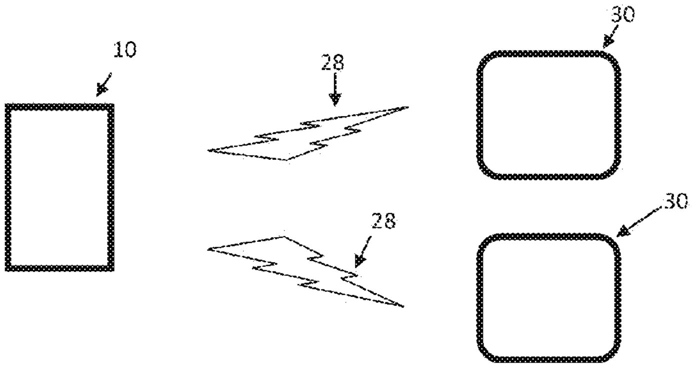
FIG. 5 depicts another simplified system diagram of the system of FIG. 1.

As depicted in FIG. 5, the device 10 is operable to communicate via one or more communications link(s) 28, which may variously connect to one or more remote devices 30 such as servers, personal computers, terminals, wireless or handheld computing devices, landline communication devices, or mobile communication devices such as a mobile (cell) telephone. At least one of a plurality of communications link(s) 28 may be connected to an external computing network through a telecommunications network.

In the embodiment described, the remote devices 30 include other devices 10, owned and/or operated by other persons, devices operated by employees of the Car Park Owner/Management Company, as well as a computing system 32 owned and operated by a Parking Administrator. In embodiments of the invention, the Parking Administrator is the same as the Car Park Owner/Management Company. In alternative embodiments, they are different entities. The Management Company is most likely also the Adminstrator, whereas the Owner might outsourse the Management and Adminstration, and thus not necessarily be the Manager and Administrator of the system 8.

The Parking Administrator computing (PC) system 32 has the form of a server 34 in the embodiment. The server 34 may be used to execute application and/or system services such as a system and method for implementing at least one action based on a location of a mobile communication device in accordance with an embodiment of the present invention. As will be described in further detail, a main data function of the server 34 is predominantly based on the storage and processing of parking bay mapping data and information associated with registered users (RU) of the system 8. In the embodiment, the server 34 is physically located at a centrally managed control station, offsite from the car park 12. In alternative embodiments, it may be held on a cloud based platform.

Similar to the device 10, the server 34 comprises suitable components necessary to receive, store and execute appropriate electronic program instructions. The components include processing means in the form of a server processor, server storage comprising read only memory (ROM) and random access memory (RAM), one or more server input/output devices such as disc drives, and an associated server user interface. Remote communications devices 30 (including the device 10) are arranged to communicate with the server 34 via the one or more communications link(s) 28.

The server 34 is capable of receiving instructions that may be held in ROM, RAM or disc drives and may be executed by the server processor. The server processor is operable to perform actions under control of electronic program instructions, as will be described in further detail below, including processing/executing instructions and managing the flow of data and information through the computing system 32.

The server 34 includes a server operating system which is capable of issuing commands to access a plurality of databases or databanks which reside on the storage device thereof. In the embodiment, two such databases or databanks are provided, comprising: one of registered users (RU) of the system, which may be referred to as an RU database 36; and one of the hereinbefore described location details, including the parking bay mapping data, which may be referred to as a Parking Mapping (PM) database 38. The operating system is arranged to interact with the databases 36 and 38 and with one or more computer programs of a set/suit of server software to cause the server 34 to carry out the respective steps, functions and/or procedures in accordance with the embodiment of the invention described herein.

The US app, computer programs of the server software set, and other electronic instructions or programs for the computing components of the device 10 and the server 34 can be written in any suitable language, as are well known to persons skilled in the art. For example, for operation on a device 10 comprising an IPHONE® smartphone, the US app may be written in the Objective-C language. In embodiments of the invention, the electronic program instructions may be provided as stand-alone application(s), as a set or plurality of applications, via a network, or added as middleware, depending on the requirements of the implementation or embodiment.

In alternative embodiments of the invention, the software may comprise one or more modules, and may be implemented in hardware. In such a case, for example, the modules may be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA) and the like.

The respective computing means can be a system of any suitable type, including: a programmable logic controller (PLC); digital signal processor (DSP); microcontroller; personal, notebook or tablet computer, or dedicated servers or networked servers.

The respective processors can be any custom made or commercially available processor, a central processing unit (CPU), a data signal processor (DSP) or an auxiliary processor among several processors associated with the computing means. In embodiments of the invention, the processing means may be a semiconductor based microprocessor (in the form of a microchip) or a macroprocessor, for example.

In embodiments of the invention, the respective storage can include any one or combination of volatile memory elements (e.g., random access memory (RAM) such as dynamic random access memory (DRAM), static random access memory (SRAM)) and non-volatile memory elements (e.g., read only memory (ROM), erasable programmable read only memory (EPROM), electronically erasable programmable read only memory (EEPROM), programmable read only memory (PROM), tape, compact disc read only memory (CD-ROM), etc.). The respective storage may incorporate electronic, magnetic, optical and/or other types of storage media. Furthermore, the respective storage can have a distributed architecture, where various components are situated remote from one another, but can be accessed by the processing means. For example, the ROM may store various instructions, programs, software, or applications to be executed by the processing means to control the operation of the device 10 and the RAM may temporarily store variables or results of the operations.

The use and operation of computers using software applications is well-known to persons skilled in the art and need not be described in any further detail herein except as is relevant to the present invention.

Furthermore, any suitable communication protocol can be used to facilitate connection and communication between any subsystems or components of the device 10, any subsystems or components of the server 34, and the device 10 and server 34 and other devices or systems, including wired and wireless, as are well known to persons skilled in the art and need not be described in any further detail herein except as is relevant to the present invention.

Where the words "store", "hold" and "save" or similar words are used in the context of the present invention, they are to be understood as including reference to the retaining or holding of data or information both permanently and/or temporarily in the storage means, device or medium for later retrieval, and momentarily or instantaneously, for example as part of a processing operation being performed.

Additionally, where the terms “system”, “device”, and “machine” are used in the context of the present invention, they are to be understood as including reference to any group of functionally related or interacting, interrelated, interdependent or associated components or elements that may be located in proximity to, separate from, integrated with, or discrete from, each other.

Furthermore, in embodiments of the invention, the word “determining” is understood to include receiving or accessing the relevant data or information.

In the embodiment of the invention, the display 20 for displaying the user interface 22 and the user input means 24 are integrated in a touchscreen 40. In alternative embodiments these components may be provided as discrete elements or items.

The touchscreen 40 is operable to sense or detect the presence and location of a touch within a display area of the device 10. Sensed “touchings” of the touchscreen 40 are inputted to the device 10 as commands or instructions and communicated to the controller 16. It should be appreciated that the user input means 24 is not limited to comprising a touchscreen, and in alternative embodiments of the invention any appropriate device, system or machine for receiving input, commands or instructions and providing for controlled interaction may be used, including, for example, a keypad or keyboard, a pointing device, or composite device, and systems comprising voice activation, voice and/or thought control, and/or holographic/projected imaging.

Input may also be received via at least one sensor which is part of a sensor system or a set of sensors 42 of the device 10. Individual sensors within the set of sensors 42 are operable to monitor, sense and gather or measure sensor data and/or information associated with or relating to characteristics, properties and parameters of the device 10, the surrounding environment, or components, systems or devices associated therewith or coupled thereto. For example, the set of sensors 42 is operable to sense and gather sensor data relating to a state of the device 10 and/or a state of the environment surrounding the device 10.

In the embodiment, the state of the device 10 comprises a real time physical location (geographic position) of the device 10.

Preferably, determination of the device location is predominantly radio-location based and/or Global Navigation Satellite Systems (GNSS) driven, and even more preferably making use of additional secondary technologies to enhance the accuracy of primary location readings, which may be necessary to compensate for limitations in using GNSS indoors, such as in an undercover car park, for example. In this manner, the embodiment of the invention advantageously does not require the installation of additional sensory infrastructure within a predetermined parking area or within car bays of a parking facility.

In embodiments of the invention, infrastructure may be installed in the parking area. This may comprise a GNSS antenna, and/or a LocataLite network, and/or TimeTenna antenna to provide amplification and/or correction data to receiving means of the device 10. The purpose of these antennas is not to create a sensory network of nodes that detect when a vehicle is parked within a parking space, but more so to create an amplification network for Locata® technology and GNSS enabled devices to receive location correction readings. Amplification is provided to a position reading, thereby supplying practically near, if not exact, pinpoint location corrections to the device 10.

The GNSS is a satellite-based locating and navigating utility providing real time data to determine a devices precise latitude, longitude and altitude by tracking signals from satellites 44. It includes, but is not limited to NAVSTAR Global Positioning System (GPS)—USA, GLONASS—Russia, Compass—China, Galileo—European Community and Japanese systems.

As will be further described, via sensory technology of the set of sensors, which may include one or a combination enabling use of Locata®, GNSS, Wifi, Bluetooth, Near Field Communication (NFC), radio, and handset inertial sensor technologies, readings are obtained via which the system 8 is operable to pinpoint the location of a digitally and/or physically marked, pre-surveyed area when the device 10 is located within the parameters of the area. The device 10 comprises operably connected/coupled components facilitating performance as described, including appropriate computer chips (integrated circuits), transceiver/receiver antennas, and software for the sensory technology being used.

In the embodiment depicted in FIG. 1, the system 8 utilises a Real Time Kinetic (RTK) network 46 for outdoor positioning. The set of sensors 42 of the device 10 in this embodiment comprises a position sensor comprising an appropriate chipset, antenna, and/or assisted GPS to receive corrections from the RTK network 46 to pinpoint its accuracy.

Particularly, RTK satellite navigation is a technique used to enhance the precision of position data derived from satellite based positioning systems signals, being usable in conjunction with GNSS. It uses measurements of the phase of the signal’s carrier wave, rather than the information content of the signal, and relies on a triangulation of base stations to provide real time corrections to a GNSS receiver, providing up to centimeter level accuracy.

Most major global cities, states, counties and provinces have an existing RTK network generally comprising prefixed base stations 48 operable to deliver corrections to GNSS enabled devices and receivers, such as the device 10.

Land and hydrographic surveyors connect to the RTK network (where available) in lieu of setting up and connecting to their own base stations. It is more convenient, provided the infrastructure is already in place.

The embodiment of the invention uses the correction data supplied by local RTK networks to increase the accuracy with which the position of present GPS and GNSS devices can be determined when connected to the RTK network.

Provided the correct interface software is installed on the device 10 to connect with the RTK network 46 and the mobile antenna and/or chipset is capable of picking up the correction, the device 10 should be enabled to receive GNSS signals, hence providing the needed accuracy to register a device 10 when located within a predefined and pre-surveyed parking bay 14 in the embodiment.

In embodiments, this technology replicates that of a GNSS micro-chip receiver in a mobile device and is ideal for tracking and registering the outdoor location of a device within the framework of the embodiment of the invention.

Figure 6:
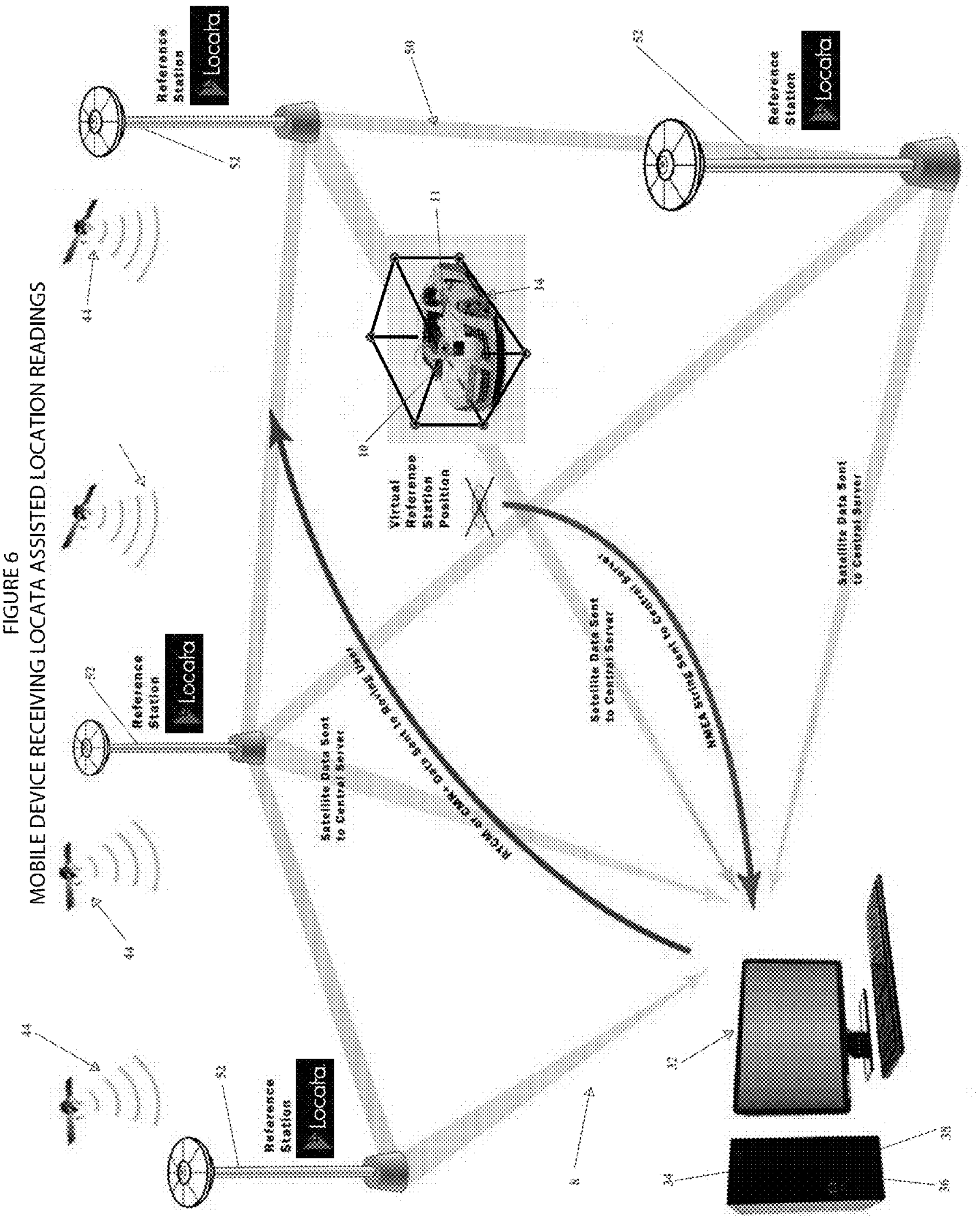
FIG. 6 depicts a simplified system diagram of an alternative embodiment of a system in accordance with an aspect of the present invention.

In an alternative embodiment depicted in FIG. 6, the system 8 utilises a LocataLite® network 50. This technology utilizes a network or small, ground-based transmitters that blanket a chosen area with strong radio-positioning signals. The set of sensors 42 of the device 10 in this embodiment is such that the device 10 is GNSS enabled. The LocataLite® network 50 assists the device 10 with Locata® location correction readings, thereby providing increased reliability when accurate positioning is required indoors and in built up urban areas, such as cities, for example. Additionally, it can function independently of GPS, thereby providing a back-up if a GPS signal is interfered with or interrupted, such as being scrambled or spoofed, for example.

Radio-location technology provided under the trade mark Locata® is operable to provide precise positioning in many environments where GPS is either marginal or unavailable for modern applications. In this technology, a network of terrestrially-based Locata®Lite transceivers 52 transmits extremely well-synchronized signals. These signals form a positioning network provided under the trade mark Locata®Net that operates in combination with GPS (for example in open-cut mining applications) or totally independent of GPS (for example, indoors or in urban areas).

Locata®Net networks are operable to replicate a GPS satellite constellation locally—on the ground. Locata® technology allows an entity, including those responsible for a mine, port, construction site, warehouses, airports, strategic infrastructure, and entire cities, to determine the reliability and accuracy of positioning they wish to deploy, under their own local control, with complete autonomy. Locata Corporation calls this resource "Your own GPS".

A Locata®Net network is operable to provide independent GPS-style performance because the technology enables the network to autonomously synchronize transceivers to nanosecond level (i.e. one billionth of a second) without using any atomic clocks or other external aids.

In embodiments such as that depicted in FIG. 6, Locata® technology and/or other similar radio-location technologies are used to provide pinpoint position registration to the device 10, connecting to the software interface of the system 8.

The operable coupling of these technologies, and particularly GNSS mobile computer chips with indoor positioning support, advantageously provides a high level of consistency and accuracy in registering location data as required when implementing an action based on location, and particularly in a location comprising a car park. In this regard, although GPS is a very efficient navigator, a main limitation of it is functioning well indoors, due to the mobile device not having direct access to the GPS satellites 44. Furthermore, it can also be prone to inconsistent performance when the mobile device is placed underneath large objects, such as trees, for example.

The introduction of GNSS in mobile navigation computer chips allows a mobile device to receive corrections from four separate satellite constellations (GPS, GLONASS, SBAS and QZSS) comprising 59 earth satellites, providing a far more accurate reading, especially outdoors.

The indoor limitations are addressed in embodiments of the invention through introducing a combination of sensory technologies that support WiFi, Bluetooth, NFC, radio and/or handset inertial sensor readings to assist the mobile device 10 in further correcting readings.

Broadcom Corporation is a global leader in connectivity solutions to home, office and mobile environments. The vast majority of smartphones, mobile and handheld devices have Broadcom® computer chips powering the connectivity solutions to their operating systems.

Broadcom Corporation made a public announcement on 21 Mar. 2013 that their BCM 4752 micro-chip receiver for smartphones and mobile handsets will have the capability to locate a user's location indoors and outdoors, with pinpoint accuracy.

By using WiFi, Bluetooth, NFC, radio and/or handset inertial sensor readings as connectivity vehicles, this micro-chip receiver will add accelerometers, gyroscopes, magnetometers and altimeters to the output positioning engine, thus increasing navigation to pinpoint accuracy.

The BCM 4752 micro-chip, and similar technologies as provided by other companies, are used in embodiments of the invention to facilitate the pinpoint accurate determination of geographic position of the device 10. In the embodiment, this is then used to provide a real time parking service that does not require the installation of photographic or sensory based infrastructure in parking bays and car parks, as herein described.

In an embodiment, the state of the device 10 further comprises a velocity and/or speed of the device 10. The set of sensors 42 include an inertial sensor system comprising an acceleration sensor and an orientation sensor, an altimeter, a direction sensor and a position sensor. Alternative embodiments of the invention may comprise additional or alternative sensors.

The acceleration sensor is operable to measure an acceleration of the device 10 and produce an acceleration data. For example, the acceleration sensor may be an accelerometer. The orientation sensor is operable to measure a rate of change of the orientation (i.e., angular rate) of the device 10 and produce an orientation data. For example, the orientation sensor may be a gyroscope. The direction sensor is operable to determine a direction relative to the Earth's magnetic poles and produce a direction data. For example, the direction sensor may be an electronic compass.

The position sensor is operable to determine a position of the device 10 and produce a position data as hereinbefore described.

The use and operation of such sensors is well-known to persons skilled in the art and need not be described in any further detail herein except as is relevant to the present invention.

One or more sensors of the set of sensors 42 may be integrated with the device 10, is may be the case where it comprises an IPHONE® smartphone. Alternatively, the mobile device 10 may be operably coupled to one or more of the above-described set of sensors 42.

In addition to being stored on the PM database 38, in the embodiment at least some of the location details of at least some of the plurality of prescribed locations are stored or saved in a database 54 or databank residing on the storage 18 and accessible by the controller 16 under control of the US app. These may be installed as part of the US app. The controller 16 is arranged to interact with the database 54 to cause the device 10 to carry out the respective steps, functions and/or procedures in accordance with the embodiment of the invention described herein.

The details of others of the plurality of prescribed locations are stored or saved remotely, for example in one or more remote database modules residing on respective storage of one or more remote systems or devices 30, such as the PM database 38 of the server 34 and accessible by the device 10 via the one or more communications link(s) 22. The controller 16 is arranged to facilitate user interaction with the one or more remote databases to make the remotely stored content available for use as required.

It will be understood that the database(s) may reside on any suitable storage device, which may encompass solid state drives, hard disc drives, optical drives or magnetic tape drives. The database(s) may reside on a single physical storage device or may be spread across multiple storage devices or modules.

The database 54 is coupled to the controller 16 and in data communication therewith in order to enable information and data to be read to and from the database 54 as is well known to persons skilled in the art. Any suitable database structure can be used, and there may be one or more than one database. In embodiments of the invention, the database 54 can be provided locally as a component of the device 10 (such as in the storage 18) or remotely such as on a remote server, as can the electronic program instructions, and any other data or information to be gathered and/or presented.

Similarly, both of the RU and PM databases 36 and 38 are coupled to the server 34 and are in data communication therewith in order to enable data to be read to and from the RU and PM databases 36 and 38 as is well known to persons skilled in the art. Any suitable database structure can be used. Any one or both of the RU and PM databases 36 and 38 can be provided locally as a component of the server 34 (such as in the memory device) or remotely such as on a remote server, as can the server set of software. In an embodiment, several computers can be set up in this way to have a network client-server application. In the embodiment described each of the RU and PM databases 36 and 38 is stored internally in the memory device of the server 34 as partitions of a single database structure. In alternative embodiments of the invention, there may be more or less databases.

Once the US app is installed on the device 10, the controller 16 is operable, under control of the US app, to present, via the touchscreen 40, a sequence of electronic pages, screens and forms to a user or operator of the device 10 allowing for the inputting or capture of information and/or data, including data and/or information sensed via sensors of the set of sensors 42, instructions and commands pertinent to operation of the device 10 and the system 8.

In the embodiment described, the server software set of the server 34 comprises: a web server application, a registration and point of sale system application, a management application, a communication application, an invoicing/billing application and a payment processing application.

As will be described in further detail, via the respective applications of the server software set, the server 34 is operable to perform functions including: registration and sharing of RU location based data; calculating and trading data including the RU data and parking bay mapping data; extracting, converting and combining the RU data and PB mapping data with location based data received via the US app; and recording all real time data passing through the US app interface and the registration and point of sale system.

The web server application is operable to deliver content relating to the system 8 via a dedicated website, such as web pages or other electronic pages or screens, to existing or potential users of the system 8. The website is accessible via a web browser of an Internet enabled mobile communication device, such as a notebook computer or a smartphone, (including the device 10 in the embodiment) operably connected to be in data communication with the system 8 via a communication network. In the embodiment described, the means of data communication is through the Internet, however, other methods, such as direct connection, may be employed in other embodiments of the invention.

The content may include advertising and promotional or public relations information delivered via an appropriate one or combination of forums or medium including, for example, services provided under the trade marks YouTube™, Facebook™ and/or Twitter™.

One of the web pages that may be accessed comprises an online registration page. The web server application is operable to enable a potential user of the system to manually register or record themselves as a user by completing and submitting to the server 34, via the registration page, a communication in the form of an electronic registration form comprising user registration information.

In embodiments of the invention, prior to being granted access to the registration page a potential user (who may be an administrator of one or more registration account(s) associated with them, as will be described in further detail) is required to supply a personal identification, such as a username, which may be in the form of an email address, and security details, which may comprise a password. Once this is done the potential user/account administrator is provided with relevant access to an interface of an administrator's control panel. The control panel is a secure area that contains sensitive information about account(s) associated (or to be associated) with the administrator, including details of the administrator, users of vehicles registered with the system 8 under the account, the vehicles themselves and billing/payment information. In the embodiment, the password is self generated as part of the first stage of the registration process. When the administrator registers their email address, they need to verify their email address by retrieving the email from their account and clicking through on a link provided by the email. The e-mail also comprises a self generated password in the embodiment. This action flags within the system 8 that they have provided a credible email address and once they place the password into the registration box with the verified email address, the system 8 is operable to progress them through to a second stage (final stage) of the registration process. At such time, they will be able to change their password as desired, to something more memorable for example, and input any further information.

The user registration information includes details comprising information and/or data relating to the user including:

1) Vehicle Identification Details: Details facilitating identification of at least one car or other vehicle of the user to be registered. These identification details may comprise make, model, colour, and number plate of the vehicle. In embodiments of the invention, more than one vehicle can be registered for an account, with application to individuals and companies having more than one vehicle.

2) Administrator (Vehicle Owner) Details: Details facilitating identification and communication with the owner. The owner may be any entity recognized by applicable laws, including natural persons (i.e. real human beings) and legal or juristic persons such as a company or corporation, for example. In cases where the owner is a legal or juristic person, the device 10 (and vehicle) is of course operated by a real human having authorisation for such use on behalf of the owner. These details may comprise registered company/business and/or private home/postal address of the user, user's full company/business or private name(s), and any other unique and/or relevant identification information (such as an Australian Company Number (ACN) in the case of an Australian company, for example, or date of birth in the case of a natural person) as applicable. This information is used by the system 8 for communicating with the owner, including correspondence related to billing, receipt, and infringement notices.

3) Vehicle Driver Details: Details facilitating identification and communication with the person who will be driving the vehicle. These details may comprise similar information as the Administrator (Vehicle Owner) Details. The same information will apply unless the vehicle owner and vehicle driver are different parties.

4) Billing and Payment Details: Details facilitating billing and receiving payment from the debtor (person) responsible for paying for use of the system 8 by the vehicle driver. The billing details may comprise a physical and/or electronic mail address to be used for forwarding correspondence including, for example, billing, parking receipt, and infringement notices for processing and payment. The payment details may comprise details of a financial account, such as a credit card account of the debtor, stored and used to purchase items associated with actions performed via the system 8, such as purchasing parking tickets in the embodiment. Additional and/or alternative payment processing platforms can be used, including, but not limited to PayPal and Bitcoin (BTC) services, for example, in embodiments of the invention.

Once the required user registration information has been successfully entered, prior to completing the registration process, security details in the form of a customisable security code is assigned for each driver. In embodiments of the invention, the administrator controls the main account. If a business has a number of vehicles, they may wish to track the parking activity of each. Each user is assigned a security code to enter into the application when they wish to park (this does not mean that they are administrator). If there is an instance of only a single user/administrator (which will most often occur with the general public), there will only be one security code. As described, part of the information entered via the registration screen includes a response to a question asking the administrator how many vehicles they would like to register for the account.

In the embodiment, the security code comprises 4-6 numeric digits required to be used and entered to satisfy at least part of a security protocol to provide access to the US app when the driver wants to use the system 8 (via the US app) to perform an action, such as locating, reserving, registering, and purchasing parking, for example.

In embodiments of the invention, this, additional and/or alternative operations performed by the system 10 occur automatically, without requiring human intervention.

In alternative embodiments of the invention, the user registration information may comprise alternative or additional details, information and/or data.

All data and information collected via applications of the server software set, including the web server application and the registration and point of sale system application is distributed within the PC system 32 for use as described herein. Furthermore, the PC system 32 comprises suitable timing means such as a timer or clock providing timing information and/or data for use in scheduling actions as described herein.

The RU database 30 has a plurality of RU records. Each RU record comprises a set of RU information relating to an RU of the system 10, including the registration information as hereinbefore described, along with other information associated with the RU, including the allocated security details.

The server 34 has sensing means operable to sense or detect the receipt of communications comprising user registration information (sent via the dedicated website or other means as herein described). Upon sensing the receipt of such information, the server 34, via its processor under control of relevant applications of the server software set, including a database management module or application, is operable to generate, populate and manage records in the RU database 36, (as well as records in the PM database 38) and to execute actions as described herein according to the data and information received.

The registration and point of sale system application, which may be referred to as a registration app, provides an alternative means via which a potential user can automatically register or record themselves in the system 8. This app can be downloaded or otherwised saved or pre-installed on the device 10 by the potential user. Once installed on the device 10 the registration app is operable to present, via an interface such as the touchscreen 40 of the device, a sequence of electronic pages, screens and forms to the potential user allowing for the inputting or capture of the user registration information. Completion of these by the user, via the interface, results in the inputted user registration information being communicated to the server 34 for populating in relevant fields of the RU database 36. Particularly, via the registration app the user is able to interact with the system 10 and perform actions including inputting data or information required to register therewith.

Registration via the website application may be more beneficial for those wishing to register more than one vehicle. In this regard, an administrator looking after a business account with the system 8 may find it more useful to use the web interface provided by the website application. In embodiments of the invention, comparatively the mobile interface may seem small and may display less information than the web interface. In embodiments of the invention, the web interface may be provided with more customizable information and queries. For those registering a single vehicle, a web interface might never be needed or used.

On successful completion, the inputted information is communicated to the server for population in the RU database 36 as hereinbefore described. The security code allocated to the user upon successful registration is communicated to the device 10, and displayed via the touchscreen 40.

The management application is operable to facilitate the performance of business administration and management functions associated with the Car Park Owner/Management Company. This includes managing user accounts. Additionally, the management application includes analysis and reporting applications or modules. These are respectively operable to analyse or process data and information pertinent to the system 8, and to generate reports on the results of the analysis. This may comprise the management application extracting real time data from the server 34 and converting it into quantifiable information that verifies the performance of an individual or grouped parking bays 14, for example.

In the embodiment, access to the management application is made available to (authorised persons of) the company via a secure online portal. The portal has various levels of customisable access, with a system administrator having highest level clearance. Additionally and/or alternatively, further access to the management application can be gained via a website or another application that is compatible with mobile communication device 30.

Depending on the information contained in the reports, they may be made publicly available, such as via the dedicated website, and/or privately, such as via an optionally encrypted communication to a communications device 30 of the company, for example.

Depending on their content, the report(s) generated may be used by their respective recipients for a plurality of purposes.

For example, reports may be generated detailing information on the volume and usage of different car bays 14 within the car park(s) 12 which the company has registered with the system 8. This will allow the company to make informed decisions on potentially revaluing different parking bays 14. These terms and conditions can then be passed onto the vehicle user via the US app. It can be seen that the input additionally comprises an indication of an extent of historical activity associated with the predefined area (i.e. volume and usage of different car bays 14 in the embodiment), and the system 8 is operable to assign a value to the predefined area(s) on the basis of the indication of extent of historical activity. The value may comprise a price or cost for use of the predefined area.

Particularly, in the embodiment, due to the nature and accuracy of the information, the management application allows parking valuation management activities to be performed, enabling the company to evaluate the information to enforce a system of valuing a particular parking bay, which may be similar to that of valuing real estate. In this manner, the management application performs as a parking valuation management system.

Those parking bays or parking zones (consisting of a group of bays) with the highest performing volumes, may be charged at higher parking rates, whilst decreasing the rates on bays that are registering a lower occupation.

These changes may be set to be time and date specific. This may comprise, for example, charging higher for peak hours and dropping the rate in quieter times to encourage usage.

In alternative embodiments of the invention, additional and/or alternative factors may be used in determining parking conditions and pricing. Prices may be set automatically by the management application via use of a demand/supply algorithm or calculation processing the relevant factors.

Once the parking conditions and rates are established, they are logged through the management application to be stored on the server 34 and then communicated to the user via the US app.

The company can also make users aware that the rates and conditions on different parking bays change throughout the year, for example with road works or special events. This can be easily registered against various parking bays and notification provided via the US app.

By doing this, the usage of parking bays can be closely monitored to establish the elasticity of different pricing structures and various seasonal, environmental and commercial (for example, gaining/losing a supermarket in the area) changes and demands.

This will advantageously provide the company the flexibility to manage the car park from a more commercially minded perspective, whilst adding value to the car park user as they choose their parking, based on factors including cost and convenience.

The management application also allows parking infringement management activities to be performed. By having access to real time parking data of their car park(s), the Car Park Management and Administration Company is able to schedule human resources more effectively to target only those vehicles that have not or are not “checked out” (i.e. have remained in a parking bay 14 for a period of time longer than paid for/allowed according to the applicable parking conditions).

Infringement notices can be registered instantly against vehicles found to be illegally parked, through use of a portable computer or other suitable device 30 with an installed management app or otherwise having access to the management application. Once this notice is registered, the user will be notified through their US app and given the option to pay instantly.

Parking infringement officers employed by the company may be provided access to real time mapping information via the management application, the mapping information identifying vehicles with expired parking tickets that have not checked out. As hereinbefore described, in each bay 14 is allocated a unique identification, such as a unique number, and once the officer loads up the management application on their portable device 30, the car park area will display as a map, highlighting the parked bays that are not marked as “checked out”.

The officer can then choose to generate and issue an electronic infringement via the management application, which then registers to the user via the US app for (optionally) instant electronic payment.

It also provides all parties with a more efficient, transparent and accountable way of monitoring and processing parking infringements.

Automatic notifications can also be set to be sent through to the user via the US app at a predetermined time and date in relation to the registered issue date/time of the ticket, informing the user that further penalties could apply if their payment is not received in time.

The rates and conditions that relate to the infringement notices and fines can all be customised via the management application.

Management accounting activities may also be performed via the management application, facilitating the management of all day to day accounting income and expenditure activities relating to the management of the car park 12.

An authorised person of the company having the appropriate security clearance is able to log onto the management application to track and monitor the management accounting information.

Income and expenditure accounting information and key performance reports may also be made available to the company via the management application. This may be used for accounting purposes, such as preparing an appropriate tax report for forwarding to an appropriate party, such as an accountant, for further preparation and submission.

Reports containing data relating to demographic and user trends of a particular car park may be provided to businesses within the locale, for example, to assist in creating promotion based marketing. In embodiments of the invention, such businesses are able to register with the system 8, via the management application, to conduct promotion based marketing to electronic parking ticket holders. As part of the registration process required to use the system 8, users may be able to able to customise their user settings to receive or not to receive marketing notifications via the US app.

The communication application is operable to enable communication between the server 34 and devices in communication therewith. Such communication includes the communications described herein, including the various notifications and reports, and may be of any appropriate type including email, pop-up notifications, and SMS messages.

A potential user can also register or record themselves as a user by providing the user registration information via email, facsimile, or other communication, which may be via a social networking service such as Facebook™ or Twitter™, for example, for automatic capture and entry into the RU database 36 by action of software of the set of server software or by a data entry operator or other employee of the company.

The invoicing/billing application is operable to generate an invoice for each registered user comprising an amount payable according to their usage of the system 8.

The payment processing application is operable to receive payment for each invoice.

The above and other features and advantages of the embodiment of the invention will now be further described with reference to the system 8 in use, with reference to the flow chart depicted in FIG. 7 of the drawings.

An interested person registers as a user of the system 8 via the registration process as hereinbefore described, resulting in them being provided with a user account.

This account will provide them, and any specified vehicle driver(s), with access to the registered car park(s) 12 where the system 10 is being used and notify them, via the US app, if alternative payment facilities are available at the car parking 12 (i.e. payment facilities additional to those provided via the system 8). If other payment facilities are available, the user will not be able to pre-book/reserve a parking bay 14 in the embodiment, unless the company managing the car park 12 has agreed to reserve and physically demarcate a section of the car park 12 for sole use of the system 8 for pre-bookings/reservations (in which case a relevant bay 14 within the reserved section may be pre-booked).

Once installed, the US app is operable to calculate and determine the location of the device 10 via the information and/or data received via the location based technology, and implicitly the RU's physical location, and to extract PM and RU data from the respective PM database 38 and RU database 36, respectively, for processing as required.

Provided the driver of the vehicle is an RU and they have the RU app installed on their device 10, the device 10 will interface with the location based technology and pinpoint the location/position of the device 10 (and associated driver and vehicle).

The user's location is determined and registered automatically with the system 8 via the device 10. Advantageously, the user is not required to register their location manually, via an SMS message, smartphone application or mobile phone call, for example.

The device 10 is then operable to communicate the determined information to the server 34. Receipt causes the two information platforms, comprising (1) user's location based information and (2) the pre-surveyed mapping information, to interface with each other, merging the location based information with the mapping information and other location details, and transmitting a queried result communication message back to the device 10 to be displayed to the driver via the touchscreen 40.

The queried result communication provides the RU with information, including parking bay availability, and an executable option to action the purchase of a ticket for an available parking bay, provided their associated device 10 is located within the parameters of the bay 14.

The US app will also provide the user with an optional navigation function to their pre-booked parking bay or the car park 12, as applicable, via the touchscreen 40.

Once they arrive and park their vehicle in a designated or selected bay 14, the US Application will register their location and confirm that they are within the pre-booked or other available bay 14.

At registration, the user will be notified of the parking terms and any conditions that might apply. They may then select their parking time and process their electronic parking ticket instantly via the US app.

The US app is also operable to generate and display notifications to the RU via the touchscreen 40 prior to the expiry of their electronic parking ticket, which can be instantly renewed and extended, regardless of the location of the RU's mobile device 10. In embodiments of the invention, these may comprise a pop up notification displayed (with optional accompanying sound and/or tactile alert) to prompt the user a preferably prescribed (such as 15 min) or user selectable period of time prior to the expiry of the ticket. A notification badge may also be provided on an application icon associated with the US app and displayed via the touchscreen 40, in case notification pop ups have been disabled. If the ticket is renewable (sometimes it wont be, due to parking conditions and restrictions, for example), the user is able to click through on the notification, causing the US app to load. A payment renewal screen is then displayed with a tarrif appropriate to a time extension of their choosing. They can then choose to renew their ticket instantly via the payment renewal screen, if desired. If the user does not respond to the notification, another will be displayed (again with optional accompanying sound and/or tactile alert) a preferably prescribed (such as 5 min) or user selectable period of time prior to expiry of the ticket. If the user still does not respond, another will another will be displayed (again with optional accompanying sound and/or tactile alert) at expiry of the ticket with a notification that the vehicle is illegally parked. If they are issued a parking fine, another notification will appear with an option to pay instantly via the US app. They can renew their ticket after expiry if they wish to do so in embodiments of the invention.

The US app can also action a "check out" command, comprising an automatic prompt (although it can also be manually selected) provided by the US app to the RU via the touchscreen 40 that actions them to manually register their departure from the parking bay 14 prior to expiry of their electronic parking ticket.

As hereinbefore described, prior to the ticket expiring, a notification will be sent to the user's portable device 10, which will provide them with an option to "check out" or renew their ticket.

If they choose to check out, the US app will register that the user does not intend to renew their parking ticket and the vehicle will vacate the parking bay prior to the expiry of the ticket.

If the user chooses to renew the ticket, they will be able to do so without having to return to their vehicle.

If the user does not check out manually prior to expiry of the electronic parking ticket, the software will flag the RU's vehicle as potentially being illegally parked.

However, once the vehicle exits the rented parking bay 14, the RU app is operable to register that their location has changed, that the device 10 is no longer located within the virtual location box 15 associated with the bay 14, and to automatically generate and send a "check out" notification to the server 34 that the vehicle is to be checked out.

In embodiments of the invention, the US app operates as an interface to the user registration and point of sale system application of the server 34.

As depicted in FIG. 6, after a user has registered successfully (become an RU), the location detection service and point of sale function to complete the purchase of the electronic parking ticket can be reduced to a 4-8 step process. In the embodiment, the steps are as follows: Step 1 comprises the user loading the US app on the device 10; Step 2 comprises the user selecting a parking facility (garage/lot) registered with the system 8 closest to the user, or in an area which they wish to visit; Step 3 comprises the user booking/reserving a particular parking bay 14 in the car park 12 of their preference, if the option is available. The option will not always be available if alternative payment arrangements exist at the parking area or specific parking bays have not been physically demarcated for RU's of the system 8. Step 4 comprises the user navigating their way to the car park 12 and then to the pre-booked parking bay 14 or another that is available. Step 5 comprises arrival of the user being registered in the pre-booked or available parking bay 14. Step 6 comprises the user being provided with tarrif and parking conditions with an option to preselect a time period for their intended use of the parking bay 14. Step 7 comprises the user entering their security code to pay for the electronic parking ticket. Step 8 comprises the system 8 confirming that the parking ticket is paid for and registered. Of course, steps 1 to 5 may not be required if the user chooses not to use the navigation and/or reservation capabilities of the system 8.

As previously described, the administrator, being the main administrator of the account with access to setting up and altering the information and/or data associated with it, including the security codes for each RU, will also be able to recall/retrieve and print their parking ticket purchase history of their registered vehicles, through the US app or via the website. This function is especially beneficial to persons and businesses that wish to claim the parking as a tax deduction, reconcile accounts and monitor parking expenditure.

In embodiments of the invention (which may be cases where the company has registered the system 8 to be the only and primary manner of paying for parking tickets at their car park), the US app is also operable to provide real time information on the availability of parking bays 14 within a car park 12.

Once this is available, the RU will be able to pre-book a parking bay for a predetermined time and date, then navigate their way straight to the parking bay, via use of the US app, as hereinbefore described.

Once a parking bay is pre-booked, the US app will not allow other users to register and pay for parking if they were to park in the pre-booked parking bay. In this regard, if a user was to perform above described Steps 4 and 5, the US app is operable to generate and display a notification via the touchscreen 40 that their (i.e. the user's) device 10 has been located in a pre-booked/reserved parking bay 14 and will not allow them to purchase an electronic parking ticket. It is further operable to provide an option allowing the user to navigate (and book if available) to the next and closest available parking bay 14. However, unless they relocate their vehicle, they will receive a notification that they are illegally parked, which in turn will flag with the Car Park Management and Administration Company for further action as hereinbefore described.

It will be appreciated that the described embodiments of the invention provide several advantages.

The system 8 digitally records, monitors and distributes information on the real time activity of parking bays, thus resulting in quicker and more efficient means of finding and processing a parking space.

This eliminates or at least reduces the need for transport, production, maintenance and management costs associated with parking ticket machines, processing infringement notices and overall car park management.

Furthermore, there is less need to lose travel time due to not being able to find a parking space, thus also reducing congestion in major urban areas and benefitting the environment. In this regard, transportation has a direct environmental impact (13%) on our global greenhouse gas emissions. Studies show that a direct correlation exists between cities with higher congestion levels and slower parking flows.

The system 8 can easily account for all parking areas once they have been surveyed, mapped and predefined.

The system 8 lessons the time constraints and limitations attributed to personal error by automating the parking process for the end user and also incorporating an automatic payment and notification system into the parking process.

The system for implementing at least one action based on a location of a mobile communication device, the system comprising a controller, storage storing electronic program instructions for controlling the controller and input means wherein the controller is operable, under control of the electronic program instructions, to receive input via the input means, the input comprising an indication of a location of mobile communication device, process the indication to determine whether the location of the mobile communication device corresponds to a location of a predefined area, and implement the at least one action based on the determination.

A method for implementing at least one action based on a location of a mobile communication device, the method comprising storing electronic program instructions for controlling a controller and controlling the controller via the electronic program instructions, to receive an input via an input means, the input comprising an indication of a location of a mobile communication device, process the indication to determine whether the location of the mobile communication device corresponds to a location of a predefined area and implement the at least one action based on the determination.

Finally there is also a greater benefit to the local business community when people can locate and process their parking quickly, as patrons are more likely to visit these areas due to added parking convenience.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

Throughout the specification and claims, unless the context requires otherwise, the word "comprise" or variations such as "comprises" or "comprising", will be understood to imply the inclusion of a stated integer or group of integers but not the exclusion of any other integer or group of integers.

Throughout the specification and claims, unless the context requires otherwise, the term "substantially" or "about" will be understood to not be limited to the value for the range qualified by the terms.

It will be clearly understood that, if a prior art publication is referred to herein, that reference does not constitute an admission that the publication forms part of the common general knowledge in the art in Australia or in any other country.

The claims defining the invention are as follows:

1. A system for implementing at least one action based on a location of a personal mobile communication device, the system comprising:
- a personal mobile communication device, the device comprising:
  - a controller;
  - storage storing electronic program instructions for controlling the controller; and
  - input means;
  - wherein the controller is operable, under control of the electronic program instructions, to:
    - receive input via the input means, the input comprising an indication of a location of the personal mobile communication device;

process the indication to determine whether the location of the personal mobile communication device corresponds to a location of a predefined area specified on a virtual map, wherein the virtual map comprises a set of geographical and/or geological survey coordinates and wherein the set of coordinates comprise a set of ground coordinates (x and y dimensions) and a set of spatial (height) coordinates (z dimension), together defining a virtual location box; and implement the at least one action based on the determination;

a remote computing system comprising:

a server operable to perform a plurality of functions including: registration and sharing of location based data of a plurality of registered users (RU data) of the system; calculating data including the RU data and mapping data extracting, converting and combining the RU data and mapping data with location based data received from the personal mobile communication device; and, recording real time data communicated from the personal mobile communication device;

one or more databases for storing information associated with a plurality of registered users of the system and mapping data relating to the virtual map, the mapping data including other information and/or data relevant to or associated with each virtual location box on the virtual map, including a status of the virtual location box, specifying whether the virtual location box is presently one or more of vacant, occupied, or reserved; and, one or more communications links between the remote computer system and the personal mobile communication device wherein the mapping data stored in the one or more databases is accessible by the personal mobile communications device to facilitate interaction by a registered user with the one or more databases, and whereby, in use, the system records, monitors and distributes information on real time activity in each virtual location box.

2. The system in accordance with claim 1, wherein the location comprises a parking facility, the predefined area comprises a parking bay of a plurality of parking bays of the parking facility, and the at least one action is selectable from the group comprising parking navigating, registering, booking/reserving, and ticket purchasing and renewing.

3. The system in accordance with claim 1, wherein the input means comprises at least one sensor, which may be part of a sensor system or a set of sensors.

4. The system in accordance with claim 3, wherein the sensor system comprises a primary position sensor operable to generate a signal providing a primary indication of the location of the mobile device.

5. The system in accordance with claim 4, wherein the primary position sensor comprises radio-location (such as Locata®) based/enabled, Global Navigation Satellite Systems (GNSS), and/or a Real Time Kinetic (RTK), Wifi, Bluetooth, Near Field Communication (NFC), radio, and inertial sensor systems driven technology.

6. The system in accordance with claim 4, wherein the sensor system comprises a secondary position sensor operable to increase the accuracy of the primary indication of the location of the mobile device provided by the primary position sensor signal.

7. The system in accordance with claim 6, wherein the secondary position sensor preferably comprises one or a combination of Locata®, a Real Time Kinetic (RTK), Wifi, Bluetooth, Near Field Communication (NFC), radio, and inertial sensor systems.

8. The system in accordance with claim 3, wherein the at least one sensor is of the mobile communication device.

9. The system in accordance with claim 1, wherein the location of the mobile communication device is determined accurately.

10. The system in accordance with claim 9, wherein the location of the mobile communication device is determined exactly or practically near exactly with at least a location fixing with a discrepancy of less than or equal to 300 mm.

11. The system in accordance with claim 1, further comprising a display for displaying a user interface.

12. The system in accordance with claim 1, wherein the electronic program instructions comprise software, and the personal mobile communication device comprises a smartphone, personal/notebook/tablet computer, portable media device, or portable navigation device, having the software installed thereon.

13. The system in accordance with claim 1, wherein operations performed by the system occur automatically, without requiring human intervention.

14. The system in accordance with claim 1, wherein the input comprises an indication of an extent of historical activity associated with the predefined area and the controller is further operable, under control of the electronic program instructions, to assign a value to the predefined area on the basis of the indication of extent of historical activity.

15. The system in accordance with claim 14, wherein the assigned value comprises a price set automatically by use of a demand/supply algorithm or calculation.

16. The system in accordance with claim 1, wherein the system is operable to display the virtual map of the location of the mobile communication device on a display of the mobile communication device, and allowing a user of the mobile communication device to view and confirm that the indicated location of the mobile communication device corresponds to the location of the predefined area specified on the virtual map.

17. A method for implementing at least one action based on a location of a personal mobile communication device, the method comprising:

on a personal mobile communication device:

storing electronic program instructions for controlling a controller; and controlling the controller via the electronic program instructions, to:

receive an input via an input means, the input comprising an indication of a location of a personal mobile communication device;

process the indication to determine whether the location of the personal mobile communication device corresponds to a location of a predefined area specified on a virtual map, wherein the virtual map comprises a set of geographical and/or geological survey coordinates and wherein the set of coordinates comprise a set of ground coordinates (x and y dimensions) and a set of spatial (height) coordinates (z dimension), together defining a virtual location box; and implement the at least one action based on the determination; and, in a remote computing system:

performing a plurality of functions on a server including: registration and sharing of location based data of a plurality of registered users (RU data) of the system; calculating data including the RU data and mapping data; extracting, converting and combining the RU data and mapping data with location based data received from the personal mobile communication device; and, recording real time data communicated from the personal mobile communication device;

storing information associated with a plurality of registered users of the system and mapping data relating to the virtual map in one or more data bases, the mapping data including other information and/or data relevant to or associated with each virtual location box on the virtual map, including status of the virtual location box, specifying whether the virtual location box is presently on or more of vacant, occupied, or reserved; and, accessing the mapping data stored in the one or more databases by the personal mobile communications device, via one or more communications links between the remote computer system and the personal mobile communication device, to facilitate interaction by a registered user with the one or more databases, and whereby, in use, the system records, monitors and distributes information on real time activity in each virtual location box.

18. A computing means programmed to carry out the method in accordance with claim 17.

19. A non-transitory computer-readable storage medium on which is stored instructions that, when executed by a computing means, causes the computing means to perform the method in accordance with claim 17.

20. A data signal including at least one instruction which upon being received and interpreted by a computing system implements the method in accordance with claim 17.

* * * * *